(12) United States Patent
Barnwell et al.

(10) Patent No.: US 10,074,860 B2
(45) Date of Patent: Sep. 11, 2018

(54) PROCESS OF MANUFACTURING A CATALYST-COATED MEMBRANE-SEAL ASSEMBLY

(71) Applicant: JOHNSON MATTHEY FUEL CELLS LIMITED, London (GB)

(72) Inventors: David Edward Barnwell, Highworth (GB); Robert Jeffrey Coleman, Purton (GB); Angus Dickinson, Swindon (GB); Jorge Manuel Caramelo Soares, Swindon (GB); Lee Alan Sweetland, Aldbourne (GB)

(73) Assignee: Johnson Matthey Fuel Cells Limited, London, England (GB)

( * ) Notice: Subject to any disclaimer, the term of this patent is extended or adjusted under 35 U.S.C. 154(b) by 56 days.

(21) Appl. No.: 15/128,216

(22) PCT Filed: Mar. 24, 2015

(86) PCT No.: PCT/GB2015/050864
§ 371 (c)(1),
(2) Date: Sep. 22, 2016

(87) PCT Pub. No.: WO2015/145128
PCT Pub. Date: Oct. 1, 2015

(65) Prior Publication Data
US 2017/0104225 A1    Apr. 13, 2017

(30) Foreign Application Priority Data
Mar. 24, 2014    (GB) .................................. 1405210.4

(51) Int. Cl.
*H01M 8/02* (2016.01)
*H01M 8/0297* (2016.01)
(Continued)

(52) U.S. Cl.
CPC ....... *H01M 8/0297* (2013.01); *H01M 4/8828* (2013.01); *H01M 4/9041* (2013.01);
(Continued)

(58) Field of Classification Search
CPC ............ H01M 8/0297; H01M 8/0273; H01M 4/9091; H01M 4/928; H01M 4/926;
(Continued)

(56) References Cited

U.S. PATENT DOCUMENTS

2007/0213203 A1    9/2007  Sompalli et al.
2009/0165933 A1    7/2009  Losch et al.
(Continued)

FOREIGN PATENT DOCUMENTS

| CN | 102696139 A | 9/2012 |
|---|---|---|
| EP | 0 731 520 A | 9/1996 |

(Continued)

OTHER PUBLICATIONS

International Search Report, dated Jun. 9, 2015, from corresponding PCT application.
(Continued)

*Primary Examiner* — Stewart A Fraser
(74) *Attorney, Agent, or Firm* — Baker & Hostetler LLP

(57) ABSTRACT

Disclosed is a process for the manufacture of a catalyst-coated membrane-seal assembly, including:
(i) providing a carrier material;
(ii-i) forming a first layer, the first layer being formed by:
  (a) depositing a first catalyst component onto the carrier material such that the first catalyst component is deposited in discrete regions;
  (b) drying the first layer;
(ii-ii) forming a second layer, the second layer being formed by:
  (a) depositing a first seal component, such that the first seal component provides a picture frame pattern having a continuous region and void regions, the continuous region including second seal component and the void regions being free from second seal component;
(Continued)

(b) depositing a first ionomer component onto the first layer, such that the first ionomer component is deposited in discrete regions; and
(c) drying the second layer.

20 Claims, 4 Drawing Sheets

(51) Int. Cl.
| | |
|---|---|
| H01M 4/88 | (2006.01) |
| H01M 4/90 | (2006.01) |
| H01M 4/92 | (2006.01) |
| H01M 8/0273 | (2016.01) |
| H01M 8/1018 | (2016.01) |

(52) U.S. Cl.
CPC ....... H01M 4/9075 (2013.01); H01M 4/9091 (2013.01); H01M 4/926 (2013.01); H01M 4/928 (2013.01); H01M 8/0273 (2013.01); H01M 2008/1095 (2013.01)

(58) Field of Classification Search
CPC ............. H01M 4/9041; H01M 4/8828; H01M 4/9075; H01M 2008/1095
See application file for complete search history.

(56) References Cited

U.S. PATENT DOCUMENTS

| | | |
|---|---|---|
| 2009/0246593 A1* | 10/2009 | Nowatari .............. H01M 4/881 429/465 |
| 2010/0043954 A1 | 2/2010 | Shimoda et al. |
| 2010/0051181 A1 | 3/2010 | Mori |
| 2010/0216048 A1* | 8/2010 | Braeuninger ......... H01M 4/881 429/483 |
| 2010/0248075 A1* | 9/2010 | Nowatari .............. H01M 4/926 429/483 |
| 2011/0136039 A1 | 6/2011 | Lee |
| 2011/0236785 A1 | 9/2011 | Imura et al. |
| 2013/0052563 A1 | 2/2013 | Sharman et al. |

FOREIGN PATENT DOCUMENTS

| | | |
|---|---|---|
| EP | 1 702 669 A1 | 9/2006 |
| JP | 2011/065877 A | 3/2011 |
| WO | 02/39525 A1 | 5/2002 |

OTHER PUBLICATIONS

CN 201580022469.8, Notification of First Office Action dated Apr. 28, 2018 (English translation).

* cited by examiner

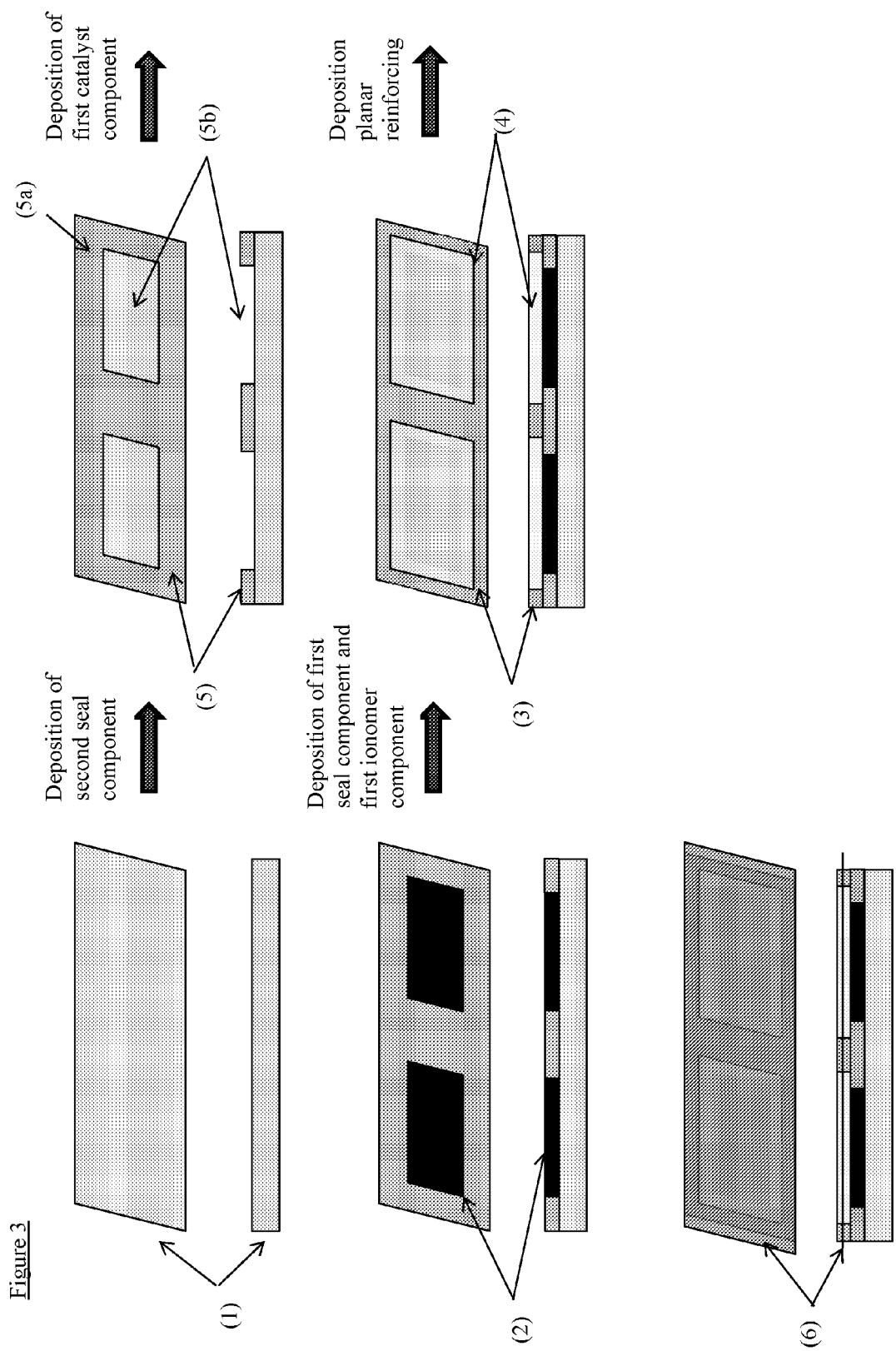

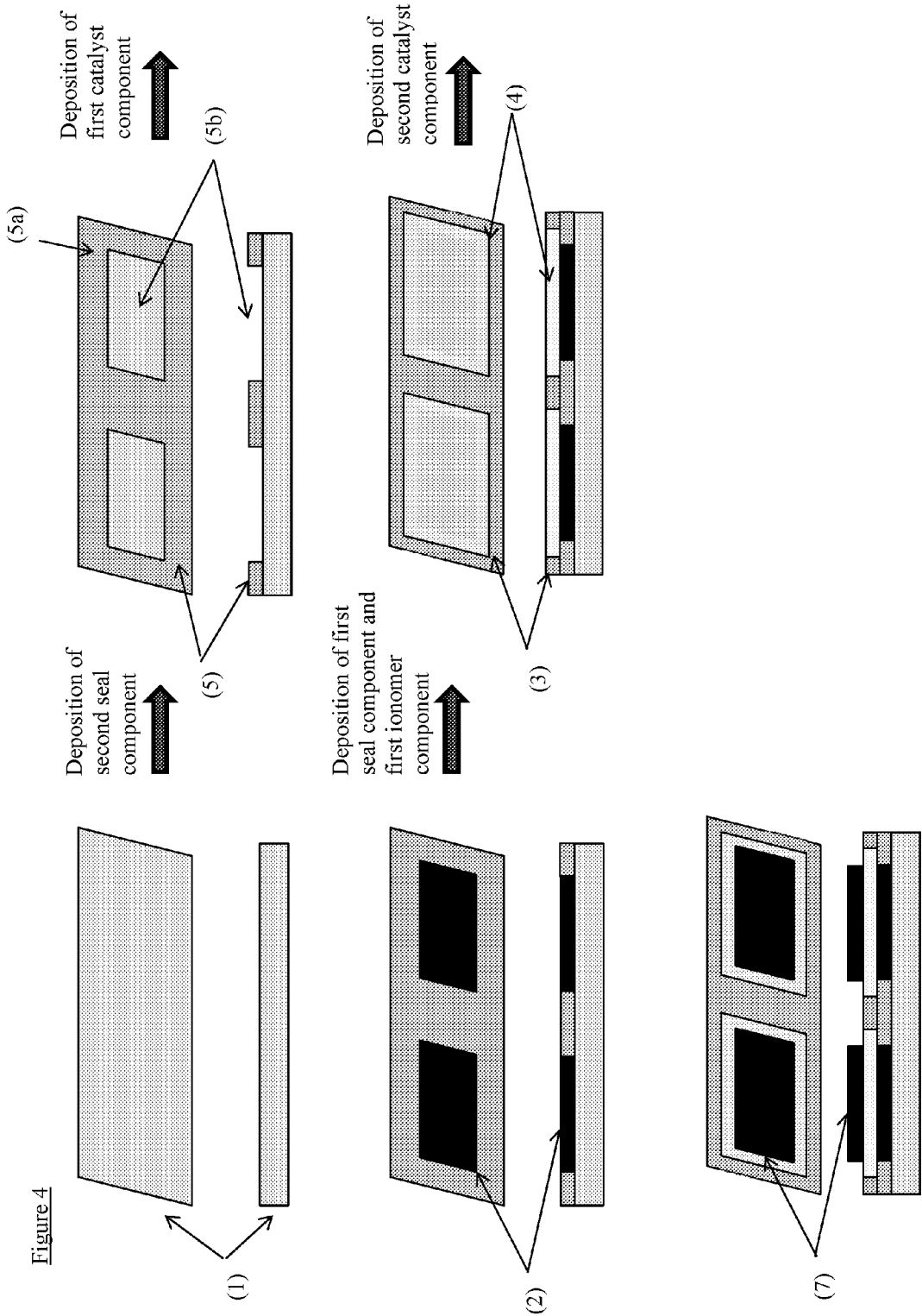

PROCESS OF MANUFACTURING A CATALYST-COATED MEMBRANE-SEAL ASSEMBLY

FIELD OF THE INVENTION

The present invention relates to a process for manufacturing a catalyst-coated membrane-seal assembly and in particular a catalyst-coated membrane-seal assembly suitable for use in a fuel cell or an electrolyser.

BACKGROUND OF THE INVENTION

A fuel cell is an electrochemical cell comprising two electrodes separated by an electrolyte. A fuel, such as hydrogen or an alcohol, such as methanol or ethanol, is supplied to the anode and an oxidant, such as oxygen or air, is supplied to the cathode. Electrochemical reactions occur at the electrodes, and the chemical energy of the fuel and the oxidant is converted to electrical energy and heat. Electrocatalysts are used to promote the electrochemical oxidation of the fuel at the anode and the electrochemical reduction of oxygen at the cathode.

In the hydrogen-fuelled or alcohol-fuelled proton exchange membrane fuel cells (PEMFC), the electrolyte is a solid polymeric membrane, which is electronically insulating and proton conducting. Protons, produced at the anode, are transported across the membrane to the cathode, where they combine with oxygen to form water. The most widely used alcohol fuel is methanol, and this variant of the PEMFC is often referred to as a direct methanol fuel cell (DMFC).

The principal component of the PEMFC is known as a membrane electrode assembly (MEA) and is essentially composed of five layers. The central layer is the polymeric ion-conducting membrane. On either side of the ion-conducting membrane there is an electrocatalyst layer, containing an electrocatalyst designed for the specific electrocatalytic reaction. Finally, adjacent to each electrocatalyst layer there is a gas diffusion layer. The gas diffusion layer must allow the reactants to reach the electrocatalyst layer and must conduct the electric current that is generated by the electrochemical reactions. Therefore the gas diffusion layer must be porous and electrically conducting.

Conventionally, the MEA can be constructed by a number of methods outlined hereinafter:

(i) The electrocatalyst layer may be applied to the gas diffusion layer to form a gas diffusion electrode. Two gas diffusion electrodes can be placed either side of an ion-conducting membrane and laminated together to form the five-layer MEA;

(ii) The electrocatalyst layer may be applied to both faces of the ion-conducting membrane to form a catalyst-coated ion-conducting membrane. Subsequently, gas diffusion layers are applied to both faces of the catalyst-coated ion-conducting membrane.

(iii) An MEA can be formed from an ion-conducting membrane coated on one side with an electrocatalyst layer, a gas diffusion layer adjacent to that electrocatalyst layer, and a gas diffusion electrode on the other side of the ion-conducting membrane.

Conventionally, the MEA is constructed so that the central polymeric ion-conducting membrane extends to the edge of the MEA, with the gas diffusion layers and electrocatalyst layers being smaller in area than the membrane such that there is an area around the periphery of the MEA which comprises ion-conducting membrane only. The area where no electrocatalyst is present is a non-electrochemically active region. Film layers, typically formed from non-ion conducting polymers, are generally positioned around the edge region of the MEA on the exposed surfaces of the ion-conducting membrane where no electrocatalyst is present to seal and/or reinforce the edge of the MEA. An adhesive layer may be present on one or both surfaces of the seal film layer. Typically, much of the polymeric ion conducting material used in the membrane extends beyond the electrochemically active region into a non-electrochemically active region, often by up to several centimeters. In low geometric area MEAs this non-electrochemically active region can contribute to as much as 50% of the entire MEA geometric area. The membrane which extends beyond the electrochemically active area does not contribute to the activity and performance. The polymeric ion-conducting membrane is one of the most costly components in the fuel cell, and it is thus desirable to minimise its usage. Furthermore, the seal film layers positioned around the edge region of the MEA are typically formed by taking a roll of film and cutting out a central region to create a window frame which is then positioned around the edge of the MEA. Thus a significant proportion of the seal film material is also wasted. Conventionally MEAs have been manufactured as individual single parts by bringing together the separate component layers and bonding them together by lamination processes involving heat and pressure. Additionally, continuous high volume manufacturing processes are also being introduced wherein a continuous roll of MEA is produced at high speed as alternatives to manufacturing processes where single, individual MEAs are assembled from the separate MEA components. These continuous processes also typically rely on lamination processes to bring together the constituent rolls of MEA component materials.

SUMMARY OF THE INVENTION

To enable a faster rate of commercialisation of fuel cells and a greater market penetration it is necessary to make further improvements to significantly reduce manufacturing costs and increase the manufacturing output rate for the MEA, whilst at the same time also improving the functional performance and durability of the MEA and also reducing the materials usage and thus costs. Current manufacturing routes that involve lamination of the components in processes involving temperature and pressure are intrinsically limited in their rate of assembly to just a few linear meters per minute. Also, as a result of the lamination process the MEA materials, and in particular the ion-conducting membrane, can be weakened during the high pressure and/or pressure bonding step, which leads to limited durability of the fuel cell stacks and premature failure. As such manufacturing processes are required where MEAs can be produced by low cost processes involving a minimal number of complex process steps, and at high speeds with the capability of producing several tens of linear meters per minute, but also simultaneously can produce MEA constructions designed for improved performance and durability and maximum utilisation of the expensive materials and components.

The present invention provides a process for the manufacture of a catalyst-coated membrane-seal assembly that does not require the use of any high temperature and high pressure lamination processes, and which provides for a high utilisation of the ion-conducting membrane and seal film materials and which provides MEAs with high performance and improved durability.

The invention provides a process for the manufacture of a catalyst-coated membrane-seal assembly, said process comprising the steps of:
(i) providing a carrier material;
(ii-i) forming a first layer, said first layer being formed by:
(a) depositing a first catalyst component onto the carrier material such that the first catalyst component is deposited in discrete regions;
(b) drying the first layer;
(ii-ii) forming a second layer, said second layer being formed by:
(a) depositing a first seal component, such that the first seal component provides a picture frame pattern having a continuous region and void regions, the continuous region comprising first seal component and the void regions being free from first seal component;
(b) depositing a first ionomer component onto the first layer, such that the first ionomer component is deposited in discrete regions; and
(c) drying the second layer;
wherein the void regions of the first seal component are centrally positioned over the discrete regions of the first ionomer component;
wherein the discrete regions of the first ionomer component are centrally positioned over the discrete regions of the first catalyst component; and
wherein steps (ii-ii)(a) and (ii-ii)(b) are carried out in either order;
(iii) removing the carrier material.

BRIEF DESCRIPTION OF THE DRAWINGS

FIGS. 1 to 4 show flow diagrams depicting a process according to the present invention.

DETAILED DESCRIPTION OF THE INVENTION

Figure 1:
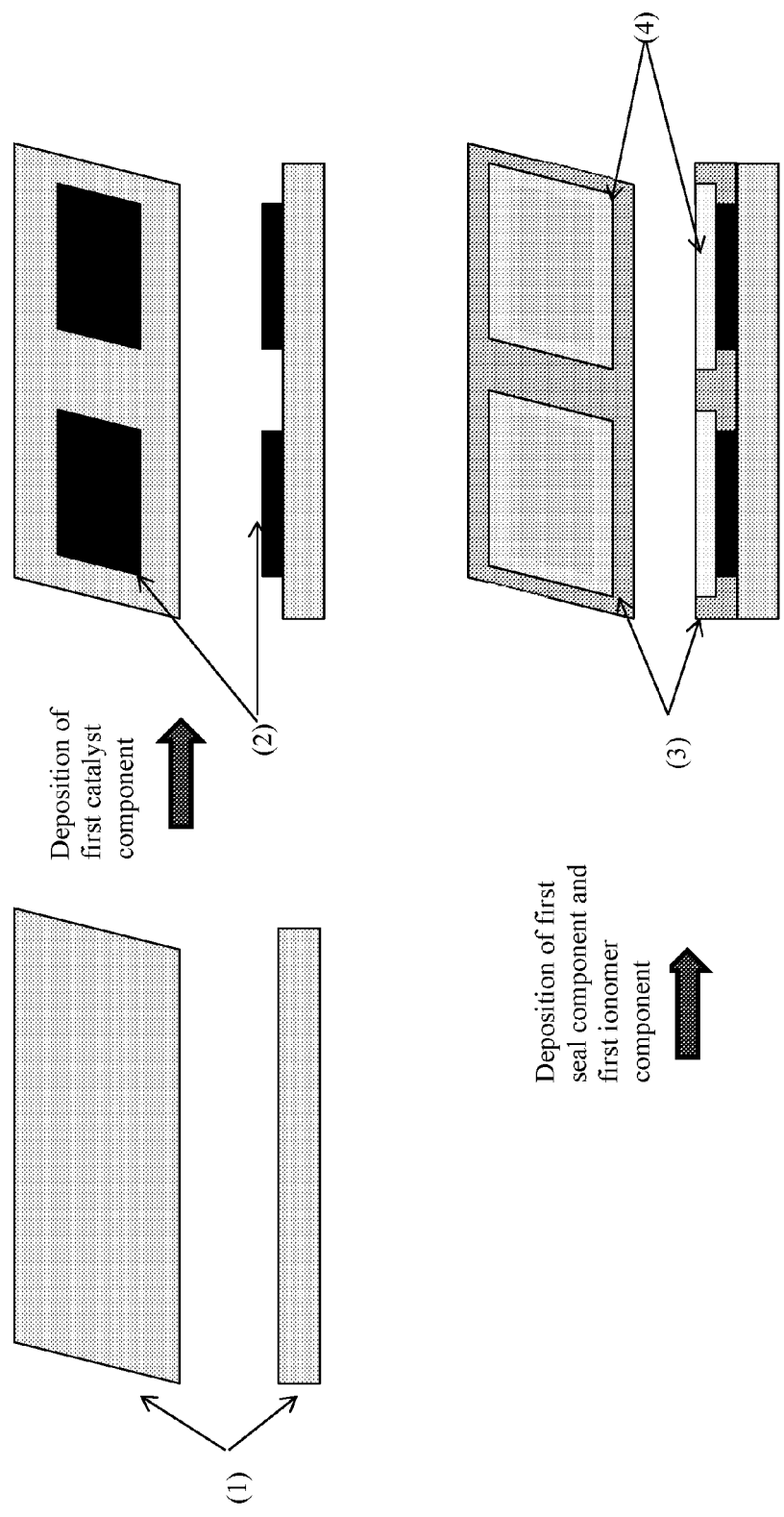

The invention provides a process for the manufacture of a catalyst-coated membrane-seal assembly, said process comprising the steps of:
(i) providing a carrier material;
(ii-i) forming a first layer, said first layer being formed by:
(a) depositing a first catalyst component onto the carrier material such that the first catalyst component is deposited in discrete regions;
(b) drying the first layer;
(ii-ii) forming a second layer, said second layer being formed by:
(a) depositing a first seal component, such that the first seal component provides a picture frame pattern having a continuous region and void regions, the continuous region comprising first seal component and the void regions being free from first seal component;
(b) depositing a first ionomer component onto the first layer, such that the first ionomer component is deposited in discrete regions; and
(c) drying the second layer;
wherein the void regions of the first seal component are centrally positioned over the discrete regions of the first ionomer component;
wherein the discrete regions of the first ionomer component are centrally positioned over the discrete regions of the first catalyst component; and
wherein steps (ii-ii)(a) and (ii-ii)(b) are carried out in either order;
(iii) removing the carrier material.

The process optionally comprises a further step after step (ii-ii):
(ii-iii) forming a third layer, said third layer being formed by:
(a) depositing a second catalyst component onto the second layer such that the second catalyst component is deposited in discrete regions; and
(b) drying the third layer;
wherein the discrete regions of the second catalyst component are centrally positioned over the discrete regions of first ionomer component.

Step (ii-i) optionally includes a further step prior to step (b):
(a') depositing a second seal component onto the carrier material, such that the second seal component provides a picture frame pattern having a continuous region and void regions, the continuous region comprising second seal component and the void regions being free from second seal component;
wherein the void regions of the second seal component and the discrete regions of the first catalyst component are centrally positioned in relation to each other; and
wherein steps (ii-i)(a) and (ii-i)(a') are carried out in either order.

Both second seal component and first catalyst component can be dried in a single step (step (ii-i)(b)). Alternatively, an additional drying step is included wherein the first of the second seal component and first catalyst layer to be deposited is dried prior to deposition of the second to be deposited of the second seal component and first catalyst layer; the second deposited component is then dried as step (ii-i)(b).

Step (ii-iii) optionally includes a further step prior to step (b):
(a') depositing a third seal component onto the second layer such that the third seal component provides a picture frame pattern having a continuous region and void regions, the continuous region comprising third seal component and the void regions being free from third seal component;
wherein the void regions of the third seal component and the discrete regions of the second catalyst component are centrally positioned in relation to each other; and
wherein steps (ii-iii)(a) and (ii-iii)(a') are carried out in either order.

Both third seal component and second catalyst component can be dried in a single step (step (ii-iii)(b)). Alternatively, an additional drying step is included wherein the first of the third seal component and second catalyst layer to be deposited is dried prior to deposition of the second to be deposited of the third seal component and second catalyst layer; the second deposited component is then dried as step (ii-iii)(b).

Step (ii-i) optionally includes a further step after step (b):
(c) deposition of discrete regions of a barrier layer onto the discrete regions of first catalyst component, wherein the discrete regions of barrier layer and discrete regions of first catalyst component are centrally positioned in relation to each other.

The process optionally includes a step (i-a) between step (i) and step (ii-i):
(i-a) forming a preliminary layer, said preliminary layer being formed by:
(a) depositing a first adhesive component onto the carrier material such that the first adhesive component provides a picture frame pattern having a continuous region and void regions, the continuous region comprising first adhesive component and the void regions being free from first adhesive component;

(b) drying the preliminary layer;
wherein the void regions of the first adhesive component and the discrete regions of the first catalyst component are centrally positioned in relation to each other.

The process optionally includes a further step after step (ii-iii):

(ii-iv) forming a fourth layer, said fourth layer being formed by:
(a) depositing a second adhesive component onto the third layer such that the second adhesive component provides a picture frame pattern having a continuous region and void regions, the continuous region comprising second adhesive component and the void regions being free from second adhesive component;
(b) drying the fourth layer;
wherein the void regions of the second adhesive component and the discrete regions of the second catalyst component are centrally positioned in relation to each other.

Within any given layer, there may be some blending of components at the interface of any two components. For example in the second layer, there may be a blended region of up to 5 mm in the planar (x and/or y) direction at the interface of the ionomer component and the seal component; this blended region will therefore comprise both ionomer component and seal component.

In the blended region, if the seal component and ionomer component are miscible, there may be complete mixing of the two components, such that distribution of the components throughout the blended region is uniform.

Alternatively, if the seal component and ionomer component are not miscible, in the blended region there may be one or more 'islands' of seal component surrounded by ionomer component.

Alternatively, in the blended region there may be one or more 'islands' of ionomer component surrounded by seal component.

Alternatively, the blended region may comprise a mixture of two or more of the arrangements described above.

Alternatively, the interface of the ionomer component and the seal component may not be perfectly linear, but may be irregular, for example providing a 'wavy' line.

Alternatively, there may be a mixture of an irregular interface and a blended region.

Although described with reference to the x and/or y directions, the blended region and irregular interface could also apply to the through-plane direction (z-direction).

Alternatively, within any given layer, one component may overlap the other component by up to 5 mm in the planar direction at the interface of the two components.

Optionally, one or more of the layers comprises a planar reinforcement component. The planar reinforcement component is added prior to step (ii-i)(b), (ii-ii)(c) and/or step (ii-iii)(b) (if a third layer is present). The planar reinforcement component is laid onto the wet catalyst, seal/catalyst, or seal/ionomer components (as applicable to the layer), suitably as a web of planar reinforcement component, such that the planar reinforcement component becomes embedded within the wet seal/catalyst, seal/ionomer or catalyst components and pores in the planar reinforcement component are essentially filled with the wet seal/catalyst, seal/ionomer or catalyst components. Alternatively, a single planar reinforcement component could span the interface between layers in the through-plane direction such that it is embedded within at least two layers.

Optionally, steps (ii-i), (ii-ii) and/or (ii-iii) can be carried out more than once to provide a catalyst-coated membrane-seal assembly comprising one or more additional seal/ionomer layers. The, or any, additional second layers are clearly deposited onto the already formed second layer. If more than two second layers are present, the second seal component and the second ionomer component in each different second layer may be the same or different. Furthermore, although the void regions of the second seal component in adjacent second layers are centrally positioned to each other, the x-y dimensions of the void regions may be different, such that the adjacent second layers may be offset from each other.

The thickness of the final catalyst-coated membrane-seal assembly in the though-plane direction (z-direction) in the region comprising catalyst component and ion-conducting component will depend on its final application. In general however, the thickness will be ≤120 µm, such as ≤70 µm, for example ≤50 µm. Suitably, the thickness is ≥10 µm. In one embodiment, the final catalyst-coated membrane-seal assembly has a thickness in the though-plane direction (z-direction) in the region comprising catalyst component and ion-conducting component of from 15-50 µm.

Generally, the thickness in the region comprising seal component will be the same as or greater than the thickness in the region comprising catalyst component and ion-conducting component.

Carrier Material

The carrier material is not part of the final catalyst-coated membrane-seal assembly, but is intended to be removed in a subsequent step; this step may be immediately after the catalyst-coated membrane-seal assembly is formed or may be at some point downstream in the manufacturing process when the catalyst-coated membrane-seal assembly is combined with other components to form a membrane-seal electrode assembly or a sub-gasketed catalyst-coated membrane-seal assembly. The carrier material provides support for the catalyst-coated membrane-seal assembly during manufacture and if not immediately removed, can provide support and strength during any subsequent storage and/or transport. The material from which the carrier material is made should provide the required support, is compatible with the catalyst component(s), ion-conducting component and seal component(s), is impermeable to the catalyst component, the ion-conducting component and seal component, is able to withstand the process conditions involved in producing the catalyst-coated membrane-seal assembly and is able to be easily removed without damage to the catalyst-coated membrane-seal assembly. Examples of materials suitable for use include a fluoropolymer, such as polytetrafluoroethylene (PTFE), ethylene tetrafluoroethylene (ETFE), perfluoroalkoxy polymer (PFA), fluorinated ethylene propylene (FEP—a copolymer of hexafluoropropylene and tetrafluoroethylene), and polyolefins, such as biaxially oriented polypropylene (BOPP). Other examples include laminates, multi-layer extrusions and coated films/foils capable of retaining their mechanical strength/integrity at elevated temperatures, for example temperatures up to 200° C. Examples include laminates of: poly(ethylene-co-tetrafluoroethylene) (ETFE) and polyethylene naphthalate (PEN); polymethylpentene (PMP) and PEN; polyperfluoroalkoxy (PFA) and polyethylene terephthalate (PET) and polyimide (PI). The laminates can have two or more layers, for example ETFE-PEN-ETFE, PMP-PEN-PMP, PFA-PET-PFA, PEN-PFA, FEP-PI-FEP, PFA-PI-PFA and PTFE-PI-PTFE. The layers may be bonded using an adhesive, such as acrylic or polyurethane.

Suitably, the carrier material is provided as a roll-good material.

The carrier material may be removed in step (iii) immediately after the catalyst-coated membrane-seal assembly is formed in step (ii), or at a point downstream in the manufacturing process. For example, the catalyst-coated membrane-seal assembly on the carrier material may be rolled to form a roll-good product to be stored and used at a later date at which point the carrier material may be removed.

Catalyst Component

The first and, if present, second catalyst components comprises one or more electrocatalysts. The one or more electrocatalysts are independently a finely divided unsupported metal powder, or a supported catalyst wherein small nanoparticles are dispersed on electrically conducting particulate carbon supports. The electrocatalyst metal is suitably selected from
  (i) the platinum group metals (platinum, palladium, rhodium, ruthenium, iridium and osmium),
  (ii) gold or silver,
  (iii) a base metal,
or an alloy or mixture comprising one or more of these metals or their oxides. The preferred electrocatalyst metal is platinum, which may be alloyed with other precious metals or base metals. If the electrocatalyst is a supported catalyst, the loading of metal particles on the carbon support material is suitably in the range 10-90 wt %, preferably 15-75 wt %/o of the weight of resulting electrocatalyst.

The exact catalyst component used will depend on the reaction it is intended to catalyse and its selection is within the capability of the skilled person.

The catalyst component is suitably applied as an ink, either organic or aqueous (but preferably aqueous). The ink may suitably comprise other components, such as ion-conducting polymer as described in EP0731520, which are included to improve the ionic conductivity within the layer. The catalyst component is applied in patches; by patches is meant discrete areas which are not connected to each other.

The catalyst layer may further comprise additional components. Such additional component include, but are not limited to, a catalyst which facilitates oxygen evolution and therefore will be of benefit in cell reversal and start-up/shut down situations, or a hydrogen peroxide decomposition catalyst. Examples of such catalysts and any other additives suitable for inclusion in the catalyst layer will be known to those skilled in the art.

For the fuel cell hydrogen oxidation electrode (anode) the catalyst layer is typically 2-10 µm in thickness, preferably 2-5 µm, and for the oxygen reduction electrode (cathode) the catalyst layer is typically 5-20 µm in thickness, preferably 2-10 µm.

Seal Component

The seal components in each layer may be the same or different or a mixture of the same and different.

The seal component is required to be compatible with the ion-conducting component and the planar reinforcing component (if present). The seal component should be non-ion conducting and within the final product must possess the necessary mechanical, thermal and chemical characteristics for operation in a fuel cell stack. The seal component must be able to withstand any deformation when the carrier material is removed on completion of the processing.

The seal component in each layer is independently selected from the group consisting of: fluorosilicones, polyurethanes, co-polyamides, epoxies and fluoroacrylates. Specific examples of suitable sealing components include: polyvinylidenefluoride (PVDF), polyetherimide (PEI), polyimide (PI), polyethersulphone (PES), fluorinated ethylene propylene (FEP), polyethylene naphthalate (PEN), ethylene tetrafluoroethylene (ETFE), Viton®, polyethylene oxide (PEO), polyphenylene ether (PPE), polyethylene terephthalate (PET), polyacrylonitrile (PAN), poly(p-phenylene sulphide) (PPS), polyolefins and silicones.

When deposited, the seal component forms a picture frame pattern having a continuous region and void regions. The continuous region surrounds the void regions and comprises the seal component.

Ion-Conducting Component

The ion-conducting component in each layer may be the same or different or a mixture of the same and different.

The one or more ion-conducting components are either selected from the group of proton-conducting polymers or are selected from the group of anion-conducting polymers, such as a hydroxyl anion-conducting polymer. Examples of suitable proton-conducting polymers include perfluorosulphonic acid ionomers (e.g. Nafion® (E.I. DuPont de Nemours and Co.), Aciplex® (Asahi Kasei), Aquivion™ (Solvay Speciality Polymers), Flemion® (Asahi Glass Co.), or ionomers based on a sulphonated hydrocarbon such as those available from FuMA-Tech GmbH as the Fumapem® P, E or K series of products, JSR Corporation, Toyobo Corporation, and others. Examples of suitable anion-conducting polymers include A901 made by Tokuyama Corporation and Fumasep FAA from FuMA-Tech GmbH.

It will also be understood and appreciated by those skilled in the art that the ion-conducting component used in any multiple depositions at stage (ii-ii) may be the same or different to the ion-conducting component used in previous depositions at this stage. For example, perfluorosulphonic acid ionomers of varying equivalent weights may be used as the ion-conducting components.

Planar Reinforcing Component

The planar reinforcing component(s) are present to provide strength and reinforcement to the layers.

The planar reinforcing components are formed from a porous material. If more than one planar reinforcing component is present in the catalyst-coated membrane-seal assembly, each planar reinforcing component may be formed from the same or different porous materials to the other planar reinforcing component(s). The porous material should possess at least some of the following properties: be compatible with the catalyst, ion-conducting and seal components such that these components can readily impregnate into the porous material and the porous material maintains its physical integrity (i.e. retains its basic pore structure) after the impregnation; provide improved mechanical strength and dimensional stability under variable humidity of the final MEA; be non-conductive; and be chemically and thermally stable at the temperatures at which the fuel cell will be operated.

Suitable planar reinforcing components include, but are not limited to, those formed from nanofibre structures (for example formed by electrospinning or force spinning), those formed from expanded polymer networks and those formed by engineering of a planar non-porous structure. Examples of materials suitable for use are typically polymeric and include polytetrafluoroethylene (ePTFE), polyvinylidene difluoride (PVDF), polyetherether ketone (PEEK), polyimide (PI), polyetherimide, polyethersulphone (PES) and polypropylene (PP).

The planar reinforcing component suitably has a thickness of 1-20 µm, suitably 3-13 µm.

The porosity of the porous material forming the planar reinforcing components is suitably greater than 30%, preferably greater than 50% and most preferably greater than 70%. Suitably, the porosity is less than 95%. The porosity (n) is calculated according to the formula n=$V_v/V_t \times 100$, wherein n is the porosity, $V_v$ is the voids volume and $V_t$ is the total volume of the porous material. The voids volume and the total volume of the porous material can be determined by the methods known to those skilled in the art.

The porous material further planar reinforcing components may be isotropic or anisotropic. If anisotropic, the direction of isotropy in adjacent planar reinforcing components may be the same or may be at an angle, such as at 90°, to each other to provide additional stability in all directions.

The, or each, planar reinforcing component can independently (i) extend to the edge of the catalyst-coated membrane-seal assembly in the cross-web direction; (ii) not extend to the edge of the catalyst-coated membrane-seal assembly in the cross-web direction.

The planar reinforcing component is applied to the wet catalyst/seal, ionomer/seal or catalyst layer before drying, suitably as a web of material. The wet catalyst/seal, ionomer/seal or catalyst layer is allowed to impregnate into the pores of the planar reinforcing component so that the pores of the planar reinforcing component are essentially filled with wet catalyst/seal, ionomer/seal or catalyst layer. By the phrase 'essentially filled', it meant that at least 90%, suitably at least 95%, and preferably at least 99% of the pore volume of the planar reinforcing component is filled.

Barrier Layer

In the manufacturing process a thin barrier layer may be deposited onto the first catalyst component to control the extent of penetration of the ion-containing component into the first catalyst component of the first layer. Suitable materials for the barrier layer include ion-conducting polymers such as proton conducting polymers or mixtures of such polymers. The barrier layer may also comprise carbon materials such as high surface area carbon blacks, heat-treated or graphitised versions thereof or graphite materials, again as single components or mixtures of such carbon materials. The barrier layer may also comprise mixtures of the proton-conducting polymers and the carbon materials. The barrier layer materials are deposited onto the first catalyst component from liquid-based dispersions of such polymers. The dispersions can be applied by such processes as slot die, spraying, ink jet and gravure onto the first catalyst component to form a thin continuous layer having a thickness in the range 0.5-5 µm, typically 1-3 µm when dry. The barrier layer fully covers the x-y dimensions of the first catalyst component and, depending on the material used for the barrier layer, may overlap onto the second seal component (if present). Overlap onto the second seal component will be in the range 0.5-5 mm, typically 1-2 mm in the planar dimension. The barrier layer when containing proton conducting polymer materials will not overlap onto the edge of the second seal component. The barrier layer dispersions may be aqueous in nature and/or organic or mixtures of the two. Organic solvents may include, but are not restricted to, components such as propan-1-ol, propan-2-ol or ethylene glycol.

Adhesive Component

The adhesive component is typically a polymeric material, and is suitably a UV curable or a pressure sensitive material (i.e. it imparts its adhesive characteristics in response to the application of pressure) and it is desirable that it possesses certain characteristics such as high melting point (≥200° C.), a softening temperature of ≤90° C. (e.g. ≥40° C. up to ≤90° C.), high chemical resistance and high resistance to hydrolytic degradation. Suitable polymeric materials include acrylics, such as polyacrylonitrile and polyacrylates and cyanoacrylates; epoxy resins; co-polyesters; copolymers of styrene and polydienes (such as styrene-butadiene and styrene-butadiene-styrene copolymers); polyamides; polyurethanes; fluoropolymer rubbers; silicones and fluorosilicones.

The adhesive component can be a fluid or viscous paste able to be deposited/applied onto a carrier material and a seal component. Deposition techniques include, but are not limited to, gravure, slot die and spraying.

The first and second adhesive components may be of the same or different materials and may be the same or different thicknesses. Each of the first and second adhesive components when deposited and dried are suitably between 1-10 µm in thickness, and preferably between 3-6 µm in thickness.

'Centrally Positioned'

Where two components are 'centrally positioned' over or in relation to each other, the planar central point of both components share the same axis perpendicular to the plane (z-axis) of the component, even though the planar area of each component can be the same or different. In reality, and due to manufacturing tolerances, the central points may be slightly off-set by up to 2 mm, for example up to 1 mm; however this is still considered to be 'centrally positioned'.

The process will be described in more detail with reference to the drawings which are illustrative and not limiting of the invention.

It will be clear to the skilled person that although the process described below is with reference to the manufacture of a continuous roll of multiple catalyst-coated membrane-seal assemblies, the basic process could be applied to the manufacture of single or individual catalyst-coated membrane-seal assemblies.

FIG. 1 shows a process for making a catalyst-coated membrane-seal assembly. A carrier material (1) is provided. A first layer is formed by applying a discrete region of first catalyst component (2) to the carrier material (1). The first catalyst component (2) is dried (not shown). A second layer is then formed by applying a first seal component (3) in a picture frame pattern having a continuous region (not identified) and void regions (not identified) and surrounding the first catalyst component (2). Discrete regions of first ionomer component (4) are applied in the void regions of the picture frame pattern of the first seal component (3). The discrete regions of first ionomer component (4) are centrally positioned over the discrete regions of first catalyst component (2). The first seal component (3) and first ionomer component (4) are dried (not shown). The carrier material is removed (not shown) to leave a catalyst-coated membrane-seal assembly with a catalyst layer on one side of the membrane-seal assembly. In FIG. 1, the planar area of the first ionomer component (4) is shown to be greater than the planar area of the first catalyst component (2); however, the planar area of the first ionomer component (4) could be the same as or smaller than the planar area of the first catalyst component (2) necessitating a corresponding reduction in the x-y area of the void regions of the first seal component (3).

Figure 2:
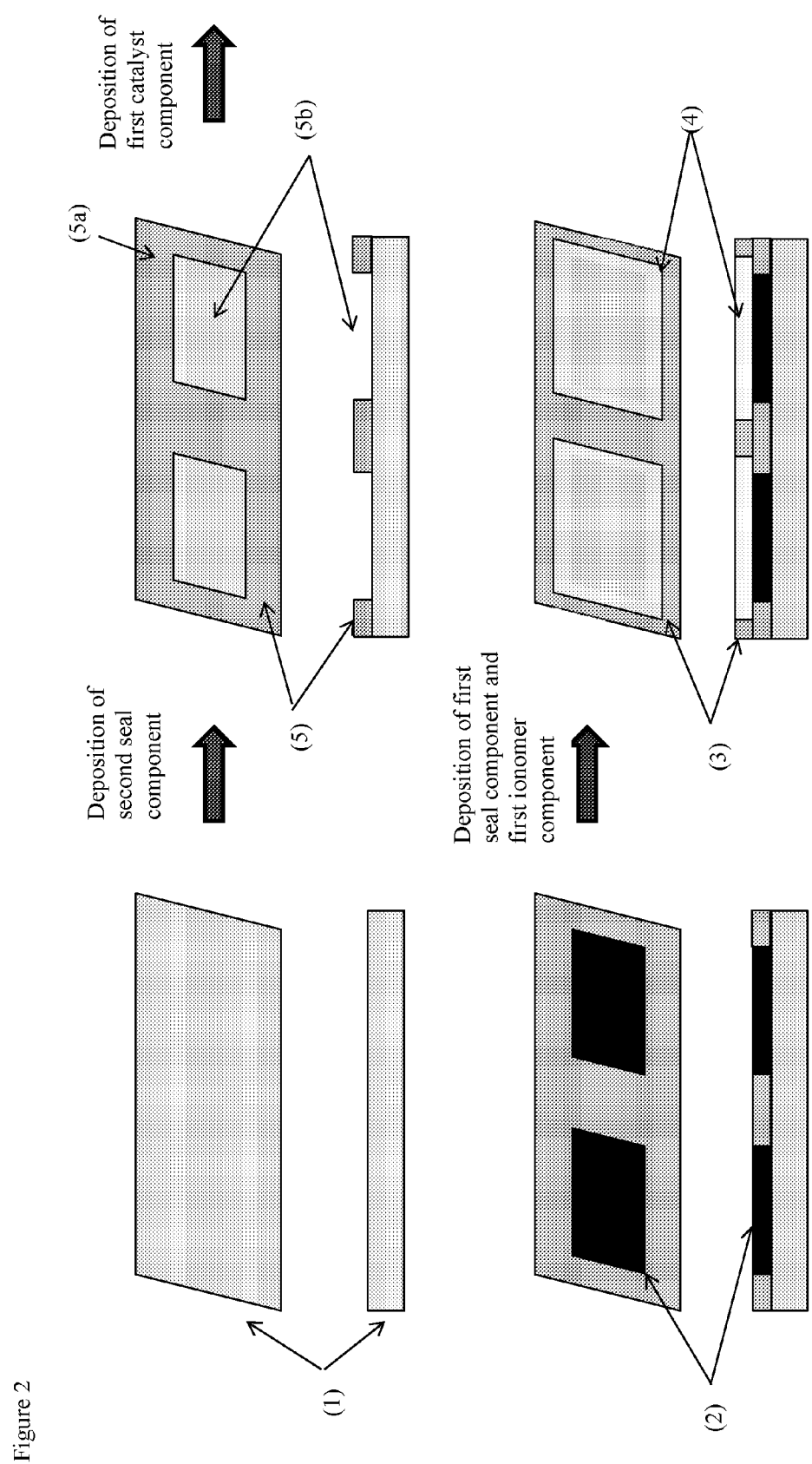

FIG. 2 shows a process for making a catalyst-coated membrane-seal assembly similar to FIG. 1, but wherein the first layer further comprises a second seal component. A carrier material (1) is provided. A first layer is formed by applying a second seal component (5) to the carrier material (1) in a picture frame pattern having a continuous region (5a) comprising seal component and void regions (5b) devoid of seal component. Discrete regions of first catalyst component (2) are applied to the carrier material (1) in the void regions (5b) of the picture frame pattern of the second seal component (5). The second seal component (5) and first catalyst component (2) are dried (not shown). A second layer is then formed by applying a first seal component (3) to the first layer in a picture frame pattern having a continuous region (not identified) and void regions (not identified). Discrete regions of first ionomer component (4) are applied to the first layer in the void regions of the picture frame pattern of the first seal component (3). The discrete regions of first ionomer component (4) are centrally positioned over the discrete regions of first catalyst component (2) and the voids in the picture frame pattern of first seal component (3) are centrally positioned in relation to the voids in the picture frame pattern of second seal component (5). The first seal component (3) and first ionomer component (4) are dried (not shown). The carrier material is removed (not shown) to leave a catalyst-coated membrane-seal assembly with a catalyst layer on one side of the membrane-seal assembly. In FIG. 2, the planar area of the first ionomer component (4) is shown to be greater than the planar area of the first catalyst component (2); however, the planar area of the first ionomer component (4) could be the same as or smaller than the planar area of the first catalyst component (2) necessitating a corresponding reduction in the x-y area of the void regions of the first seal component (3).

FIG. 3 shows a process for making a catalyst-coated membrane-seal assembly similar to FIG. 2, but wherein the second layer further comprises a planar reinforcement component. Once the second layer comprising the first seal component (3) and first ionomer component (4) has been applied onto the first layer, the planar reinforcement component (6) is applied to the wet first seal component (3) and first ionomer component (4) and becomes embedded into the wet first seal component (3) and first ionomer component (4) such that all the pores of the planar reinforcement component (6) are essentially filled with first seal component (3) or first ionomer component (4). While FIG. 3 shows the planar reinforcement component (6) embedded entirely within in the second layer, the reinforcement component could in other embodiments be embedded in the first layer instead of, or in addition to, the second layer, or alternatively, a single planar reinforcement component could span the interface between the first and second layers such that it is embedded within at least these two layers. Furthermore, one or more subsequent second layers comprising first seal component (3) and first ionomer component (4), optionally with a planar reinforcement component (6), can be provided onto the first second layer.

FIG. 4 shows a process for making a catalyst-coated membrane-seal assembly similar to FIG. 2, but wherein a third layer comprising a second catalyst component is applied to the second layer. Once the second layer comprising the first seal component (3) and first ionomer component (4) has been applied to the first layer and dried, discrete regions of second catalyst component (7) are applied to the second layer. The discrete regions of second catalyst component (7) are centrally positioned over the discrete regions of first ionomer component (4). The discrete regions of second catalyst component are dried (not shown). As shown in FIG. 4, the planar area of the second catalyst component (7) is shown to be smaller than the planar area of the first ionomer component (4); however, the planar area of the second catalyst component (7) could be the same as or greater than the planar area of the first ionomer component (4). The planar area of the second catalyst component (7) is shown to be of essentially the same size as the planar area of the first catalyst component (2); however, the planar area of the second catalyst component (7) could be larger or smaller than the planar area of the first catalyst component (2). Typically, whichever of the first and second catalyst component is to be the anode catalyst layer is larger in planar area than whichever is to be the cathode catalyst layer. The carrier material is removed (not shown) to leave a catalyst-coated membrane-seal assembly with a catalyst layer on both sides of the membrane-seal assembly. Although FIG. 4 does not include any planar reinforcing components present in any of the layers, the skilled person would realise that a planar reinforcing component could be added to the first, second and/or third layer as described in relation to FIG. 3.

The catalyst component, seal component and ionomer component are applied as a liquid or dispersion by any suitable technique known to those in the art, in conjunction with appropriate masking where appropriate. Such techniques include gravure coating, slot die (slot, extrusion) coating (whereby the coating is squeezed out under pressure via a slot onto the substrate), screen printing, rotary screen printing, inkjet printing, spraying, painting, bar coating, pad coating, gap coating techniques such as knife or doctor blade over roll (whereby the coating is applied to the substrate then passes through a split between the knife and a support roller), and metering rod application such as with a Meyer bar. The ionomer component and catalyst component are suitably applied by slot die coating. The seal component is suitably applied by gravure coating.

Each layer is dried prior to deposition of the next layer and subsequent to any deposition of a planar reinforcement component, if used. The catalyst, seal and ion-conducting components in any given layer may be dried in a single step once that layer is deposited or after deposition of each. Drying, essentially to remove the solvent(s) from the coating dispersions, may be effected by any suitable heating technique known to those in the art, for examples air impingement, infra-red, etc. Suitably, the drying is typically carried out at a temperature of 70-120° C. but will depend on the nature of the solvent and could be up to or over 200° C.

The seal component and, depending on its nature, the ion-conducting component, may also be cured, in addition to being dried, to provide mechanical and chemical strength of the component. Curing is a chemical reaction to effect a change, such as crosslinking, and could be thermally activated (e.g. by heat or IR) or activated by ultraviolet.

In addition, the ion-conducting component may be annealed, in addition to being dried (and optionally cured) to alter and strengthen the crystalline structure of the ionomer. Any annealing step would employ elevated temperature compared to the drying step, for examples up to 200° C. The annealing step would preferably be carried out after completion of the deposition of all the ionomer components at step (ii-ii) and before removal of the carrier material.

A catalyst-coated membrane seal assembly with catalyst on both faces may also be prepared by preparing two catalyst-coated membrane seal assemblies of the invention having a first layer and a second layer and combining the two catalyst-coated membrane-seal assemblies such that the two second layers are brought together and joined, e.g. by a lamination process.

The catalyst-coated membrane-seal assembly of the invention has utility in an electrochemical cell, such as a fuel cell, requiring a catalyst-coated membrane seal assembly.

Thus, a further aspect of the invention provides a membrane-seal electrode assembly comprising a catalyst-coated membrane-seal assembly of the invention and a gas diffusion layer applied to one or both sides of the catalyst-coated membrane-seal assembly. The gas diffusion layers are suitably based on conventional gas diffusion substrates. Typical substrates include non-woven papers or webs comprising a network of carbon fibres and a thermoset resin binder (e.g. the TGP-H series of carbon fibre paper available from Toray Industries Inc., Japan or the H2315 series available from Freudenberg FCCT KG, Germany, or the Sigrace™ series available from SGL Technologies GmbH, Germany or AvCarb® series from Ballard Power Systems Inc, or woven carbon cloths. The carbon paper, web or cloth may be provided with a further treatment prior to being incorporated into a MEA either to make it more wettable (hydrophilic) or more wet-proofed (hydrophobic). The nature of any treatments will depend on the type of fuel cell and the operating conditions that will be used. The substrate can be made more wettable by incorporation of materials such as amorphous carbon blacks via impregnation from liquid suspensions, or can be made more hydrophobic by impregnating the pore structure of the substrate with a colloidal suspension of a polymer such as PTFE or polyfluoroethylenepropylene (FEP), followed by drying and heating above the melting point of the polymer. For applications such as the PEMFC, a microporous layer may also be applied to the gas diffusion substrate on the face that will contact the electrocatalyst layer. The microporous layer typically comprises a mixture of a carbon black and a polymer such as polytetrafluoroethylene (PTFE). The gas diffusion layers are attached by conventional techniques.

To assist bonding of the catalyst-coated membrane-seal assembly to the gas diffusion layer(s) and formation of an integrated membrane-seal assembly, an adhesive layer may be applied on at least a part of the exposed face(s) of the seal component(s).

A further aspect of the invention provides a sub-gasketed catalyst-coated membrane-seal assembly comprising a catalyst-coated membrane-seal assembly of the invention and a sub-gasket applied to the seal component on one or both faces of the catalyst-coated membrane-seal assembly. The sub-gasket is designed to provide additional strength and robustness to the edges of the catalyst-coated membrane-seal assembly. The sub-gasket is typically a polymeric material and may be selected from the same materials as the seal component materials or may be a different type of polymer specifically selected for its application as a sub-gasket. The sub-gasket may be coated onto the seal components of the catalyst-coated membrane-seal assembly using similar processes to those described for application of the seal components, or may be applied as a pre-formed picture frame film over the seal components. The sub-gasket may include the presence of a thin adhesive layer on its surface facing the seal component to aid the bonding of the sub-gasket to the seal component, or the sub-gasket may be applied to the catalyst coated membrane-seal assembly that also comprises an adhesive component applied to the outer surfaces of the seal components. The sub-gasket may be applied to one or both faces of the catalyst-coated membrane-seal assembly, but when applied to both faces it can only be accomplished following removal of the carrier material.

A further aspect of the invention provides a sub-gasketed membrane-seal electrode assembly comprising a catalyst-coated membrane-seal assembly, a gas diffusion layer on one or both faces of the catalyst-coated membrane-seal assembly and a sub-gasket applied to one or both faces of the catalyst-coated membrane-seal assembly.

The embodiments of the invention so far been described with respect to a continuous roll of catalyst-coated membrane-seal assemblies, membrane-seal electrode assemblies and sub-gasketted membrane-seal assemblies. However, the teaching of the invention can also be applied to a single or individual catalyst-coated membrane-seal assemblies, membrane-seal electrode assemblies and sub-gasketted membrane-seal assemblies.

All of the embodiments described hereinabove apply equally to use in proton exchange membrane (PEM) based electrolysers. In these PEM electrolysers, a voltage is applied across the membrane electrode assemblies such that water supplied to the device is split into hydrogen and oxygen, at the cathode and anode respectively. The MEAs may require different catalyst components to a PEM fuel cell, such as Ir and Ru based materials at the anode, but are otherwise very similar in construction to MEAs for fuel cells.

The invention claimed is:

1. A process for the manufacture of a catalyst-coated membrane-seal assembly, said process comprising the steps of:
   (i) providing a carrier material;
   (ii-i) forming a first layer, said first layer being formed by:
      (a) depositing a first catalyst component onto the carrier material such that the first catalyst component is deposited in discrete regions;
      (b) drying the first layer;
   (ii-ii) forming a second layer, said second layer being formed by:
      (a) depositing a first seal component, such that the first seal component provides a picture frame pattern having a continuous region and void regions, the continuous region comprising first seal component and the void regions being free from first seal component;
      (b) depositing a first ionomer component onto the first layer, such that the first ionomer component is deposited in discrete regions; and
      (c) drying the second layer;
   wherein the void regions of the first seal component are centrally positioned over the discrete regions of the first ionomer component;
   wherein the discrete regions of the first ionomer component are centrally positioned over the discrete regions of the first catalyst component; and
   wherein steps (ii-ii) (a) and (ii-ii) (b) are carried out in either order;
   (iii) removing the carrier material.

2. A process according to claim 1, which comprises a further step after step (ii-ii):
   (ii-iii) forming a third layer, said third layer being formed by:
      (a) depositing a second catalyst component onto the second layer such that the second catalyst component is deposited in discrete regions; and
      (b) drying the third layer;
   wherein the discrete regions of the second catalyst component are centrally positioned over the discrete regions of first ionomer component.

3. A process according to claim 2, wherein step (ii-iii) includes a further step prior to step (b):
   (a') depositing a third seal component onto the second layer such that the third seal component provides a picture frame pattern having a continuous region and void regions, the continuous region comprising third seal component and the void regions being free from third seal component;
   wherein the void regions of the third seal component and the discrete regions of the second catalyst component are centrally positioned in relation to each other; and wherein steps (ii-iii) (a) and (ii-iii) (a') are carried out in either order.

4. A process according to claim 3, which comprises a further step after step (ii-iii):
   (ii-iv) forming a fourth layer, said fourth layer being formed by:
   (a) depositing a second adhesive component onto the third layer such that the second adhesive component provides a picture frame pattern having a continuous region and void regions, the continuous region comprising second adhesive component and the void regions being free from second adhesive component;
   (b) drying the fourth layer;
   wherein the void regions of the second adhesive component and the discrete regions of the second catalyst component are centrally positioned in relation to each other.

5. A process according to claim 3, wherein a planar reinforcement component is added prior to step (ii-i) (b).

6. A process according to claim 2, which comprises a further step after step (ii-iii):
   (ii-iv) forming a fourth layer, said fourth layer being formed by:
   (a) depositing a second adhesive component onto the third layer such that the second adhesive component provides a picture frame pattern having a continuous region and void regions, the continuous region comprising second adhesive component and the void regions being free from second adhesive component;
   (b) drying the fourth layer;
   wherein the void regions of the second adhesive component and the discrete regions of the second catalyst component are centrally positioned in relation to each other.

7. A process according to claim 2, wherein one or more of the layers comprises a planar reinforcement component is added prior to step (ii-iii) (b).

8. A process according to claim 2, wherein step (ii-i) comprises a further step prior to step (b):
   (a') depositing a second seal component onto the carrier material, such that the second seal component provides a picture frame pattern having a continuous region and void regions, the continuous region comprising second seal component and the void regions being free from second seal component;
   wherein the void regions of the second seal component and the discrete regions of the first catalyst component are centrally positioned in relation to each other; and
   wherein steps (ii-i) (a) and (ii-i) (a') are carried out in either order.

9. A process according to claim 2, wherein step (ii-i) optionally includes a further step after step (b):
   (d) deposition of discrete regions of a barrier layer onto the discrete regions of first catalyst component, wherein the discrete regions of barrier layer and discrete regions of first catalyst component are centrally positioned in relation to each other.

10. A process according to claim 2, which further comprises a step (i-a) between step (i) and step (ii-i):
    (i-a) forming a preliminary layer, said preliminary layer being formed by:
    (a) depositing a first adhesive component onto the carrier material such that the first adhesive component provides a picture frame pattern having a continuous region and void regions, the continuous region comprising first adhesive component and the void regions being free from first adhesive component;
    (b) drying the preliminary layer;
    wherein the void regions of the first adhesive component and the discrete regions of the first catalyst component are centrally positioned in relation to each other.

11. A process according to claim 2, wherein a planar reinforcement component is added prior to step (ii-i) (b).

12. A process according to claim 1, wherein step (ii-i) comprises a further step prior to step (b):
    (a') depositing a second seal component onto the carrier material, such that the second seal component provides a picture frame pattern having a continuous region and void regions, the continuous region comprising second seal component and the void regions being free from second seal component;
    wherein the void regions of the second seal component and the discrete regions of the first catalyst component are centrally positioned in relation to each other; and
    wherein steps (ii-i) (a) and (ii-i) (a') are carried out in either order.

13. A process according to claim 12, wherein a planar reinforcement component is added prior to step (ii-i) (b).

14. A process according to claim 1, wherein step (ii-i) optionally includes a further step after step (b):
    (d) deposition of discrete regions of a barrier layer onto the discrete regions of first catalyst component, wherein the discrete regions of barrier layer and discrete regions of first catalyst component are centrally positioned in relation to each other.

15. A process according to claim 14, wherein a planar reinforcement component is added prior to step (ii-i) (b).

16. A process according to claim 1, which further comprises a step (i-a) between step (i) and step (ii-i):
    (i-a) forming a preliminary layer, said preliminary layer being formed by:
    (a) depositing a first adhesive component onto the carrier material such that the first adhesive component provides a picture frame pattern having a continuous region and void regions, the continuous region comprising first adhesive component and the void regions being free from first adhesive component;
    (b) drying the preliminary layer;
    wherein the void regions of the first adhesive component and the discrete regions of the first catalyst component are centrally positioned in relation to each other.

17. A process according to claim 16, wherein a planar reinforcement component is added prior to step (ii-i) (b).

18. A process according to claim 1, wherein a planar reinforcement component is added prior to step (ii-i) (b).

19. A process according to claim 1, wherein a planar reinforcement component is added prior to step (ii-ii) (c).

20. A process according to claim 1 wherein step (ii-ii) is carried out more than once.

* * * * *